No. 716,045.  
B. R. HUSKE.  
HARVESTING IMPLEMENT.  
(Application filed May 12, 1902.)  
Patented Dec. 16, 1902.
(No Model.)
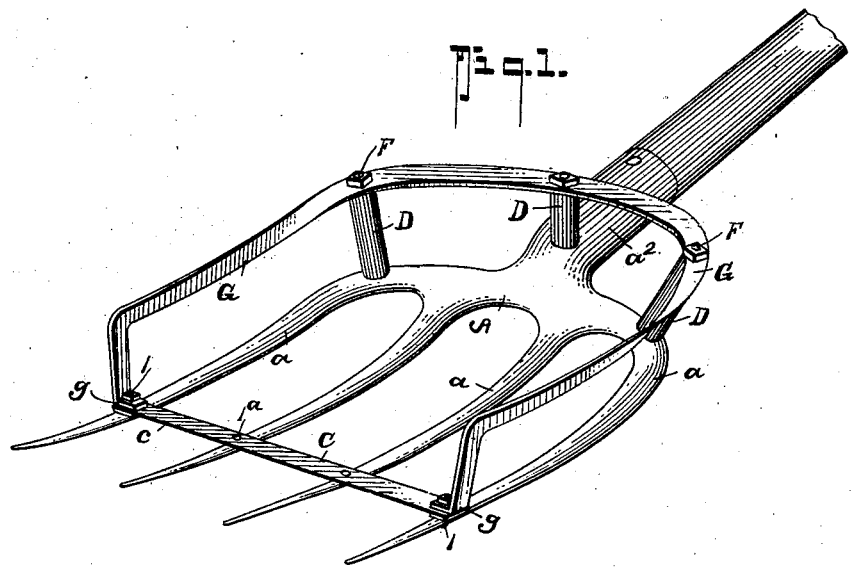
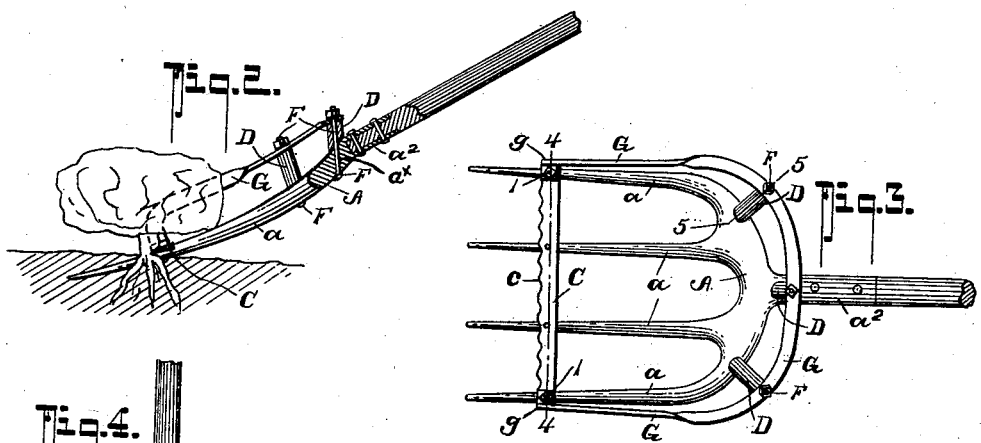
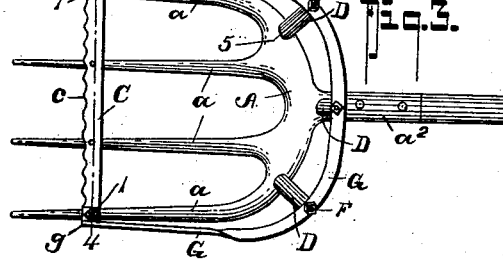
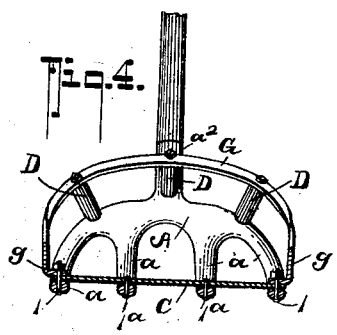
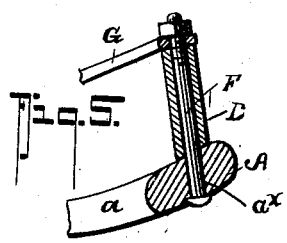
WITNESSES:
INVENTOR  
B. R. Huske  
BY  
Fred G. Dieterich & Co.  
ATTORNEYS.

UNITED STATES PATENT OFFICE.

BENJAMIN R. HUSKE, OF FAYETTEVILLE, NORTH CAROLINA.

HARVESTING IMPLEMENT.

SPECIFICATION forming part of Letters Patent No. 716,045, dated December 16, 1902.

Application filed May 12, 1902. Serial No. 106,954. (No model.)

*To all whom it may concern:*

Be it known that I, BENJAMIN R. HUSKE, residing at Fayetteville, in the county of Cumberland and State of North Carolina, have invented a new and Improved Harvesting Implement, of which the following is a specification.

My invention is in the nature of a simple, economical, and easily-manipulated hand-operated implement for harvesting lettuce, cabbage, and similar vegetables; and it comprises digging and lifting means, which may be and preferably is an ordinary pitchfork, and a combined guard and trough portion, adapted to form a basket for catching the cut vegetables, and a cutter mounted on the digging and lifting means and adapted when said means is utilized in the ordinary manner to cut the vegetables, collect them, and provide for conveniently conveying them into a wagon or other receptacle.

In its specific nature my invention consists in certain details and novel arrangement of parts, all of which will hereinafter be fully described, and specifically set forth in the appended claims, reference being had to the accompanying drawings, in which—

Figure 1 is a perspective view of my improvement. Fig. 2 is a longitudinal section thereof, illustrating the manner of its use. Fig. 3 is a plan view thereof. Fig. 4 is a transverse section on the line 4 4 of Fig. 3. Fig. 5 is a cross-section on the line 5 5 of Fig. 3.
In the practical construction my new and improved implement comprises a body having the shape of an ordinary pitch (or manure) fork, and in the preferred construction of my complete implement, on the score of economy in manufacture, I provide for detachably joining the other portions of the complete implement to the body portion, whereby the same may be conveniently attached to the ordinary pitchfork.
The main feature of my invention lies in the use of a cutting-blade C, mounted transversely on the tines of the fork or body portion A at a point sufficiently back of the penetrating ends of the tines $a\ a$ to permit of digging around and under the vegetables to be cut. The blade C may be and preferably is a flat blade of steel, having the thickness of an ordinary hack-saw and with its cutting edge $c$ downward. The edge $c$ in Fig. 1 is shown as a straight cutting edge; but it is obvious the same may be serrated or of a sickle form, as shown in Fig. 3.

Surrounding that part of the body or fork A to the rear of the cutter C is a guard G, formed of stout flexible or spring metal, the front ends $g\ g$ of which are bent down in a plane with the cutter C, whereby a single bolt 1 at each side may be utilized for securing the outer ends of the cutter-blade C and the front ends $g\ g$ of the guard, as clearly shown in Fig. 4, and to maintain the blade C in a rigid position it is further fastened to the fork or body A by the bolt-rivets $1^a\ 1^a$, as shown.

The guard G is elevated a suitable distance above the sides and bowed end of the fork A, preferably about two inches, and bowed outward from the said side and bowed end of the fork, whereby to provide a trough or basket like body to catch the vegetables as they are cut off of the stalk by the cutter C, and to sustain said guard G in its proper position it is mounted on spacing-tubes D, through which pass long nut-receiving rivets F, the lower ends of which pass through apertures $a^\times$, drilled in the side and bowed part of the fork A and to the humped portion of the handle $a^2$.

While I prefer to detachably secure the cutter and the combined guard and holding portions to the body A for the reason that it provides for economically producing my complete implement and also permits of disconnecting said portions from the pitchfork when it is desired to use the same for ordinary purposes only, it is obvious said parts may be made as a rigid or immovable portion of the complete implement.

From the foregoing description, taken in connection with the accompanying drawings, the manner of operation and the advantages of my invention will be readily apparent. No special manipulation of the same is required, as the cutting is done by ordinary body motion exerted on the fork A, the insertion of the same around the stalk of the vegetable, together with a slight lateral movement, the cutter will separate the head portion of the vegetable from the root or stalk.

I am aware that potato scoop-shovels having means for collecting the vegetable and sifting out the dirt have heretofore been provided; but so far as I know the construction of such devices have been such as to limit their practical use to that specific purpose.

My invention differentiates from what has been done heretofore, so far as I know, in the peculiar correlation of the cutter and gathering means and the body or pitchfork proper, whereby the fork may still be used (with or without the said attachments) for the ordinary purposes, and when utilized for cutting and gathering vegetables no special manipulation over the ordinary is necessary.

Having thus described my invention, what I claim, and desire to secure by Letters Patent, is—

1. An improved implement for the purposes described, comprising a body portion of pitchfork shape, and a cutter-bar mounted transversely upon the tines of the forked body, at a point between the front and rear of the forked body, as set forth.

2. An implement of the character described, comprising in combination, with the pitchfork A; a cutter mounted transversely upon the tines of the fork, at a point to the rear of the penetrating ends of the tines, and a guard disposed in a plane above the side and bowed parts of the fork and secured to said fork parts, for the purposes specified.

3. As a new article, a harvesting implement for the purposes described, comprising an ordinary pitchfork, a cutter-bar mounted transversely on the tines of the fork, a guard surrounding that part of the sides and end of the fork to the rear of the cutter-bar, and means for detachably connecting the said cutter-bar and guard to the fork, substantially as shown and described.

BENJAMIN R. HUSKE.

Witnesses:
R. H. McDUFFIE,
J. M. TOMLINSON.